United States Patent
Travostino et al.

(10) Patent No.: US 8,949,846 B2
(45) Date of Patent: Feb. 3, 2015

(54) TIME-VALUE CURVES TO PROVIDE DYNAMIC QOS FOR TIME SENSITIVE FILE TRANSFERS

(75) Inventors: Franco Travostino, Arlington, MA (US); Tal Lavian, Sunnyvale, CA (US); Bruce Schofield, Tyngsboro, MA (US); Inder Monga, Acton, MA (US)

(73) Assignee: Rockstar Consortium US LP, Plano, TX (US)

( * ) Notice: Subject to any disclaimer, the term of this patent is extended or adjusted under 35 U.S.C. 154(b) by 293 days.

(21) Appl. No.: 13/423,774

(22) Filed: Mar. 19, 2012

(65) Prior Publication Data
US 2012/0180059 A1 Jul. 12, 2012

Related U.S. Application Data

(63) Continuation of application No. 11/469,404, filed on Aug. 31, 2006, now Pat. No. 8,146,090.

(60) Provisional application No. 60/721,757, filed on Sep. 29, 2005.

(51) Int. Cl.
G06F 9/46 (2006.01)
G06F 15/173 (2006.01)
H04L 12/54 (2013.01)
H04L 12/801 (2013.01)
H04L 12/911 (2013.01)

(52) U.S. Cl.
CPC ............ H04L 12/5695 (2013.01); H04L 47/10 (2013.01); H04L 47/826 (2013.01)
USPC ........... 718/104; 718/105; 709/223; 709/224; 709/225; 709/226

(58) Field of Classification Search
None
See application file for complete search history.

(56) References Cited

U.S. PATENT DOCUMENTS

| | | | |
|---|---|---|---|
| 5,402,423 A | 3/1995 | VanKersen et al. | |
| 5,600,822 A | 2/1997 | Grice et al. | |
| 5,999,990 A * | 12/1999 | Sharrit et al. | 710/8 |
| 6,446,123 B1 | 9/2002 | Ballantine et al. | |
| 6,654,346 B1 | 11/2003 | Mahalingaiah et al. | |
| 6,665,701 B1 | 12/2003 | Combs et al. | |
| 6,993,762 B1 * | 1/2006 | Pierre | 718/102 |
| 7,093,250 B1 | 8/2006 | Rector | |
| 7,369,912 B2 | 5/2008 | Sherriff et al. | |

(Continued)

OTHER PUBLICATIONS

Camorlinga et al., "Modeling of Workflow-Engaged Networks on Radiology Transfers Across a Metro Network", IEEE Transactions on Information Technology in Biomedicine, vol. 10(2), Apr. 2006, pp. 275-281.

(Continued)

*Primary Examiner* — Adam Lee
(74) *Attorney, Agent, or Firm* — Christopher & Weisberg, P.A.

(57) ABSTRACT

A method and apparatus has been shown and described which allows Quality of Service to be controlled at a temporal granularity. Time-value curves, generated for each task, ensure that mission resources are utilized in a manner which optimizes mission performance. It should be noted, however, that although the present invention has shown and described the use of time-value curves as applied to mission workflow tasks, the present invention is not limited to this application; rather, it can be readily appreciated by one of skill in the art that time-value curves may be used to optimize the delivery of any resource to any consumer by taking into account the dynamic environment of the consumer and resource.

14 Claims, 14 Drawing Sheets

(56) References Cited

U.S. PATENT DOCUMENTS

| | | | |
|---|---|---|---|
| 7,373,410 B2 | 5/2008 | Monza et al. | |
| 7,461,376 B2* | 12/2008 | Geye et al. | 718/100 |
| 7,499,457 B1* | 3/2009 | Droux et al. | 370/395.7 |
| 7,765,028 B2* | 7/2010 | Orita | 700/248 |
| 2002/0065907 A1* | 5/2002 | Cloonan et al. | 709/223 |
| 2002/0082856 A1 | 6/2002 | Gray et al. | |
| 2002/0143847 A1* | 10/2002 | Smith | 709/103 |
| 2003/0046324 A1 | 3/2003 | Suzuki et al. | |
| 2003/0061260 A1 | 3/2003 | Rajkumar | |
| 2003/0101084 A1* | 5/2003 | Otero Perez | 705/8 |
| 2004/0064817 A1 | 4/2004 | Shibayama et al. | |
| 2004/0073643 A1 | 4/2004 | Hayes et al. | |
| 2004/0117791 A1 | 6/2004 | Prasad et al. | |
| 2005/0071577 A1* | 3/2005 | Dias et al. | 711/151 |
| 2005/0108072 A1* | 5/2005 | Retsina | 705/7 |
| 2005/0120104 A1* | 6/2005 | Boon et al. | 709/223 |
| 2006/0045096 A1* | 3/2006 | Farmer et al. | 370/395.42 |
| 2006/0195847 A1 | 8/2006 | Amano et al. | |
| 2006/0277548 A1 | 12/2006 | Abe | |
| 2006/0294522 A1 | 12/2006 | Havens | |
| 2007/0022425 A1* | 1/2007 | Jackson | 718/104 |
| 2008/0109343 A1* | 5/2008 | Robinson et al. | 705/37 |

OTHER PUBLICATIONS

Lavian et al., "A Platform for Large-Scale Grid Data Service on Dynamic High-Performance Networks", Nortel Networks Labs, et al., pp. 1-10, 2004.

Lavian et al., "DWDM-RAM: A Data Intensive Gird Service Architecture Enabled by Dynamic Optical Networks", 2004 IEEE International Symposium on Cluster Computing and the Grid, pp. 762-764.

Lavian et al., "An Extensible, Programmable, Commercial-Grade Platform for Internet Service Architecture", IEEETransactions on Systems, Man, and Cybernetics—Part C: Applications and Reviews, vol. 34(1), Feb. 2004, pp. 58-68.

Clark et al., "An Adaptive, Distributed Airborne Tracking System", MITRE Corporation, et al., pp. 1-10, 1999.

Hollingsworth, Workflow Management Coalition, The Workflow Reference Model, Jan. 19, 1995, pp. 1-68.

The Workflow Management Coalition,k Workflow Management Coalition Workflow Standard Workflow Process Definition, Oct. 25, 2002, Version 1.0, pp. 1-114.

Hayes et al., "Workflow Interoperability Standards for the Internet", IEEE Internet Computing, May-Jun. 2000, pp. 37-45.

Hagen et al., "Exception Handlin in Workflow Management Systems", IEEE Transactions on Software Engineering, vol. 26(10), Oct. 2000, pp. 943-958.

Krishnan et al., "GSFL: A Workflow Framework for Grid Services, Mathematics and Computer Science Division", Argonne National Laboratory, Argonne, IL et al., pp. 1-13, 2002.

Cao et al., "GridFlow: Workflow Management for Grid Computing", Proceedings of the 3rd IEEE/ACM International Symposium on Cluster Computing and the Grid, 2003, pp. 1-8.

Deelman et al., "Mapping Abstract Complex Workflows onto Grid Environments," Journal of Grid Computing, 2003, pp. 25-39.

Simeonidou et al., "Optical Network Infrastructure for Grid," Global Grid Forum 2002, pp. 1-55.

Pan et al., "Time in OWL-S," University of Southern California/ Information Sciences Institute, pp. 1-8, 2005.

Verma et al., "The METEOR-S Approach for Configuring and Executing Dynamic Web Processes," pp. 1-12, 2005.

Von Laszewski et al., "GridAnt: A Client-Controllable Grid Workflow Systems," Argonne National Laboratory Preprint ANL/ MCS-P1098-1003, Jan. 2004, pp. 1-10.

Arnaud et al., "Customer Controlled and Managed Optical Networks," Jan. 15, 2003, pp. 1-11.

Mambretti et al, "The Photonic TeraStream: Enabling Next Generation Applications through Intelligent Optical Networking at iGRID2002," Elsevier Science B.V., 2003, pp. 897-908.

\* cited by examiner

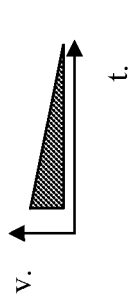
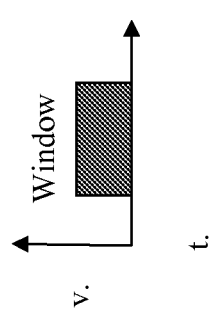
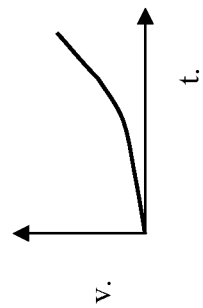
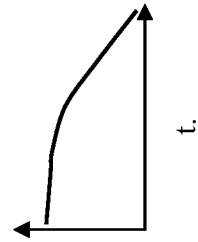
Figure 3A  Figure 3B
Figure 3C  Figure 3D
Figure 3E  Figure 3F
Figure 3G  Figure 3H

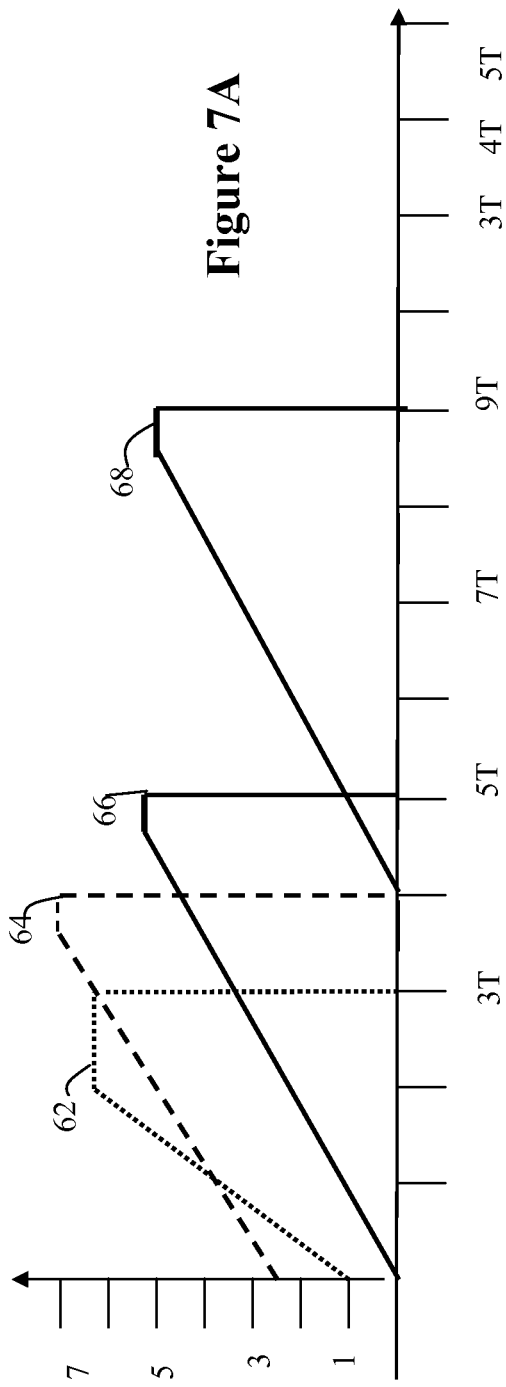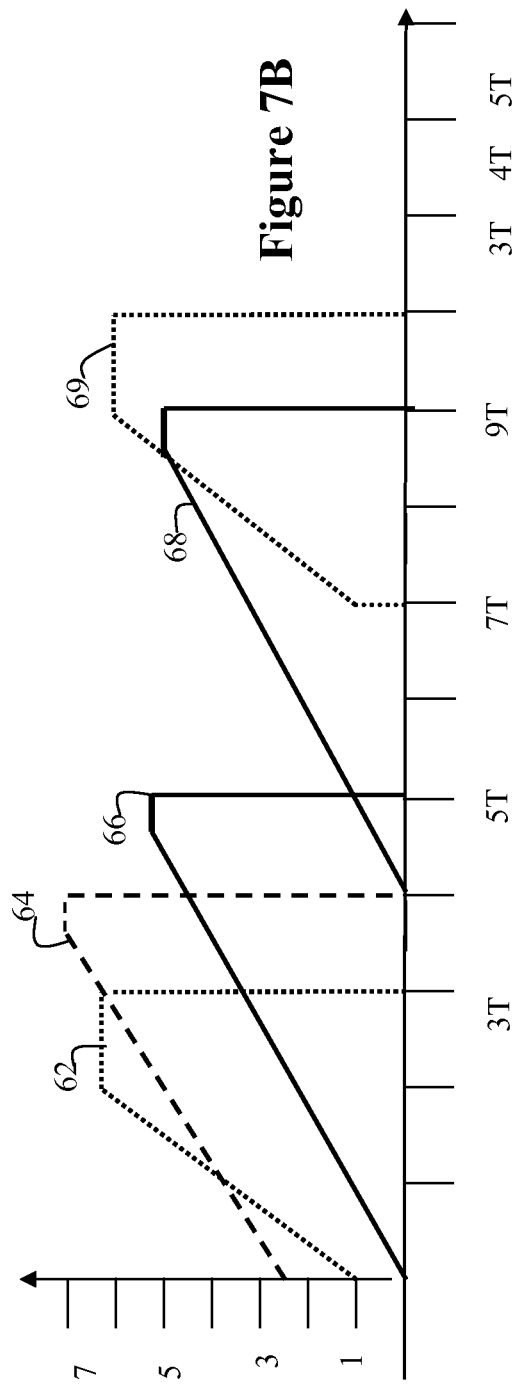

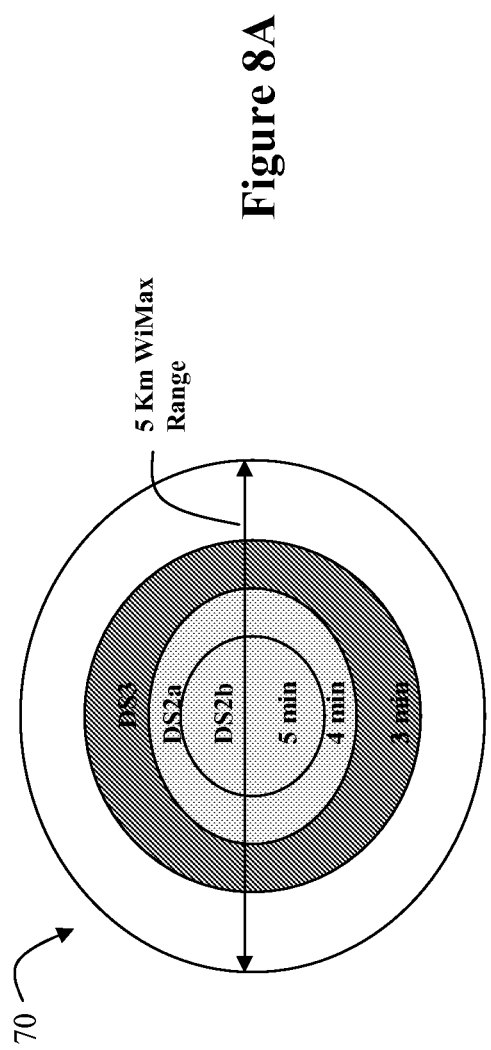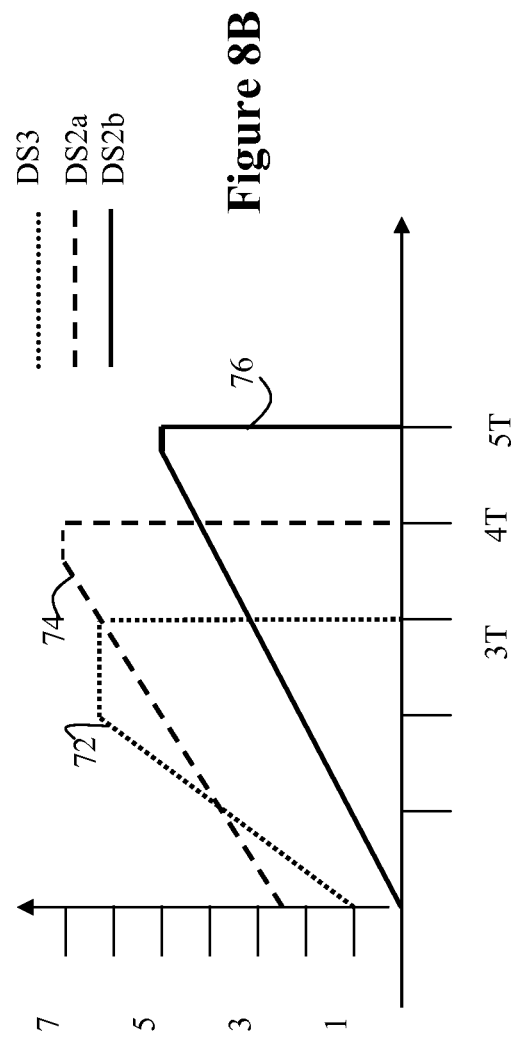

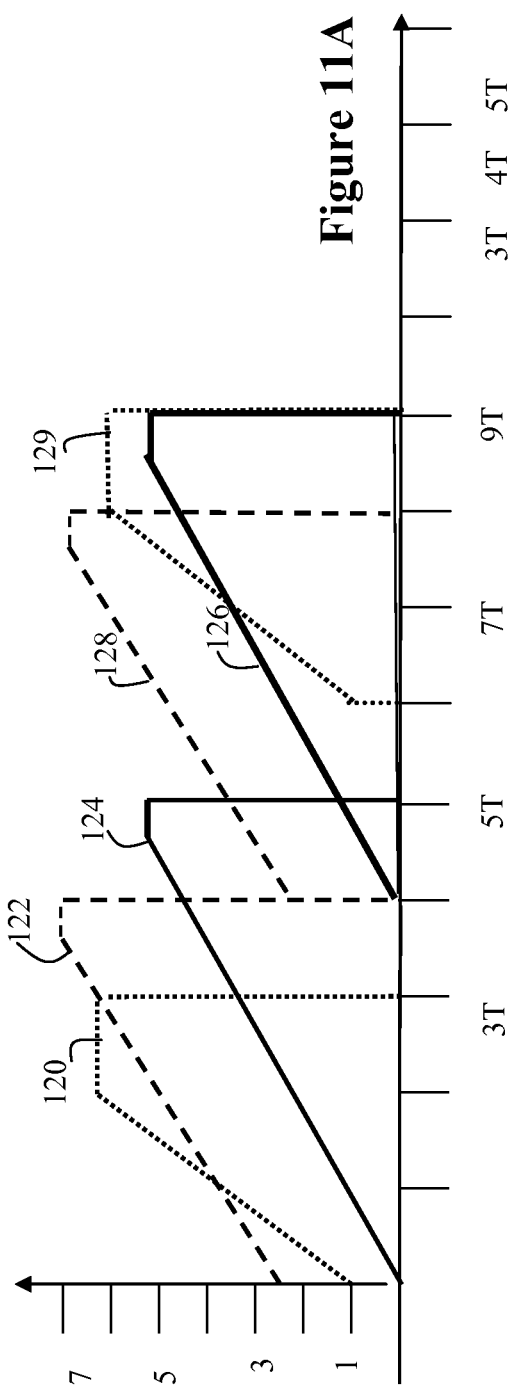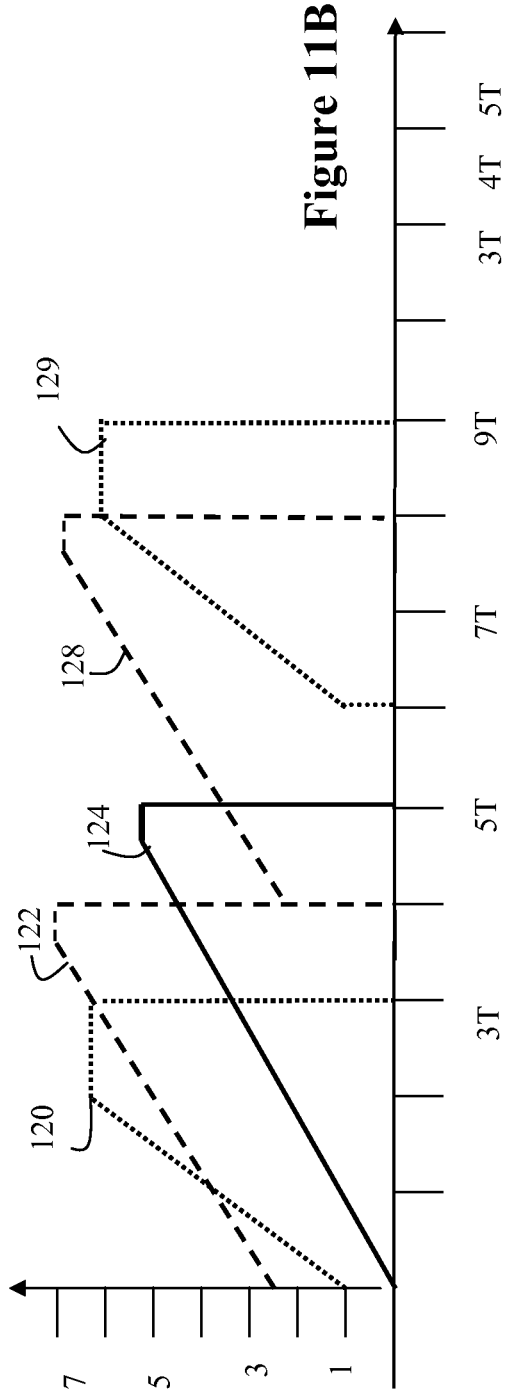

TIME-VALUE CURVES TO PROVIDE DYNAMIC QOS FOR TIME SENSITIVE FILE TRANSFERS

RELATED APPLICATIONS

This is a continuation patent application which claims priority to U.S. patent application Ser. No. 11/469,404, filed Aug. 31, 2006, entitled "TIME-VALUE CURVES TO PROVIDE DYNAMIC QoS FOR TIME SENSITIVE FILE TRANSFERS", which claims priority to U.S. Provisional Patent Application No. 60/721,757 filed Sep. 29, 2005, the entirety of both of which are incorporated herein by reference.

STATEMENT REGARDING FEDERALLY SPONSORED RESEARCH OR DEVELOPMENT

The U.S. Government has a paid-up license in the invention and the right in limited circumstances to require the patent owner to license others on reasonable terms as provided for by the terms of contact No. HR0011-05-0120 awarded by DARPA/CMO.

FIELD OF THE INVENTION

This invention relates generally to resource management and more particularly to a method and apparatus for generating and using time-value curves for resource management.

BACKGROUND OF THE INVENTION

The effectiveness of any mission is heavily reliant upon the ability of an underlying infrastructure to respond to the dynamic requirements of the mission. Typically missions are layered upon an existing resource infrastructure such that the mission becomes merely a set of tasks that is supported by the infrastructure. Layering a mission upon an existing infrastructure typically mis-utilizes key resources and increases the difficulty in detecting performance degradation or partial failures that adversely affect the mission. Allocating specific resources to a mission is technically challenging and error prone. It would be desirable to identify a mission architecture which would overcome the problems of the prior art.

SUMMARY OF THE INVENTION

According to one aspect of the invention a method of allocating a resource to a plurality of resource consumers includes the step of generating a time-value curve defining a temporally dynamic priority of a resource consumer over a time period and using the time-value curve to allocate the resource to the consumer over the time period. In one embodiment, the resource is communication bandwidth, and the resource consumers include one or more tasks in a mission workflow. Such an arrangement permits the scheduling, pre-empting and trade-off of bandwidth between different mission tasks to optimize deployment of mission tasks and concomitantly optimize mission performance.

According to another aspect of the invention, a method of allocating a resource to a plurality of resource consumers includes the steps of generating a time value curve for each one of a plurality of tasks in a workflow, the time-value curve defining a temporally dynamic quality of service to be provided to the task.

According to a further aspect of the invention, a policy engine comprises generic task profile information and time value curve generation logic operably coupled to receive task specific information and to calculate a time-value curve for the task using the generic task profile information and the task specific information.

According to a further aspect of the invention, a device comprising a computer readable medium accessible by a resource allocator is described. The computer readable medium stores a data structure comprising, for each one of a plurality of enqueued tasks associated with the resource, a time value curve defining a temporal priority to provide to the associated task, the data structure being accessed by the resource controller to control access to the resource. These and other aspects of the invention will be described with regard to the attached figures.

BRIEF DESCRIPTION OF THE FIGURES

FIGS. 3A-3H are diagrams illustrating different types of time-value curves that may used as a basis for time-curve generation by a policy engine of the present invention;

FIGS. 7A and 7B are timing diagrams provided to illustrate the addition of time value curves as tasks are added to a workflow;

FIGS. 8A and 8B are used to describe an embodiment of the present invention supporting a surveillance workflow;

FIGS. 11A and 11B are timing diagrams used to illustrate a stalled task drop capability of the present invention;

DETAILED DESCRIPTION

Figure 1:
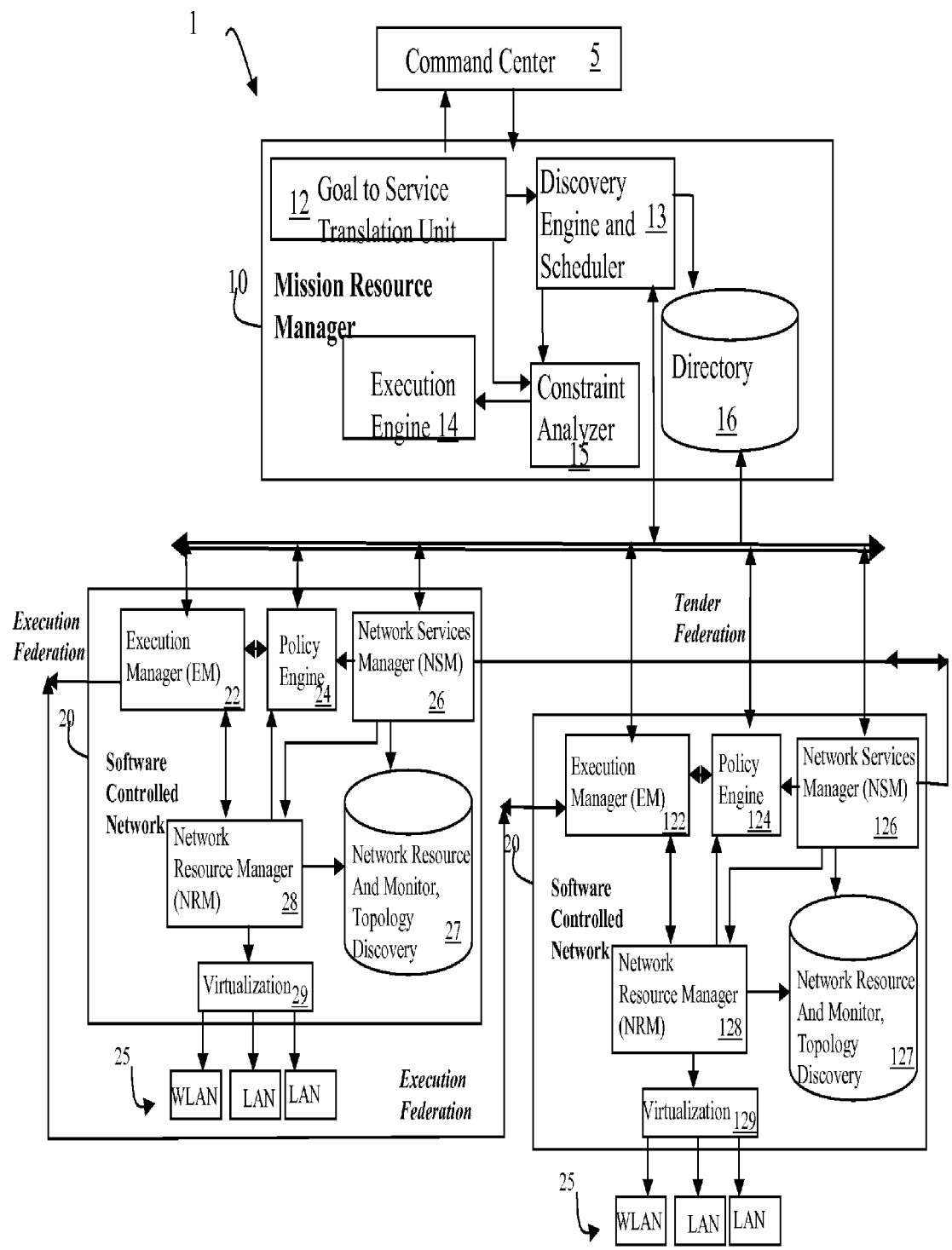
FIG. 1 is a block diagram of a mission architecture in which the present invention may be implemented.

FIG. 1 illustrates a mission architecture 1 in which the present invention may advantageously be used to optimize mission resource utilization. In one embodiment the mission architecture 1 is an adaptive network that uses Workflow Locked Loops (WLL) for mission resource selection and access management. The embodiment of FIG. 1 includes a Mission Resource Manager (MRM) 10 and a Software Controlled Network (SCN) 12. The MRM 10 essentially orchestrates the use of mission resources by a mission by identifying mission tasks and allocating mission resources to the mission tasks. Although the MRM may be described below as including certain components, it should be understood that an MRM is not a required to implement the present invention. For example, a set of Mission Goals statements may be input into the Policy Engine to help form the Time-Value curves via an administrator at a GUI or automated via a machine interface or even a Web Services Interface.

An exemplary MRM 10 includes a Goal to Service translation Unit 12. The Goal to Service translation Unit may be a semantic tool which maps a high level goal definition, such as a natural language definition, into real-language mission goals into policy statements. One exemplary method for performing Goal to Service translation is described in Ser. No. 11/469,416, entitled Mission Goal Statement to Policy Statement Translation, by Travostino et al, filed Aug. 31, 2006, incorporated herein by reference.

Policy statements are translated into workflows using the Goal to Service Translation Unit (GSTU) 12, the Constraint Analyzer (CA) 15, the Discovery Engine and Scheduler (DES) 13 and the Directory 16. Together these components identify, quantify and qualify services that are reserved for a mission as described in patent application Ser. No. 11/469,422 for Workflow Locked Loops to Enable Adaptive Networks, by Travostino et al., filed Aug. 31, 2006.

For example in one embodiment the directory 16 identifies network resources and services that may be allocated to missions. The DES 13 identifies resources and services that are available for use as an infrastructure of the mission. The CA 15 evaluates the infrastructure identified by the DES 13 in view of mission constraints. The CA 15 and DES 13 work in concert with the goal translator to identify the mission infrastructure. An Engine uses the infrastructure and mission information to generate mission workflows, which are forwarded to the SCN 14.

The SCN 14 generally controls the execution of the mission and the use of the mission resources during execution of the mission. The SCN 14 includes an Execution Manager (EM) 22, a Policy Engine (PE) 24, a Network Services Manager (26), a Network Resource Manager (NRM) 28 and a Network Resource and Topology Discovery resource 27. Together these components orchestrate the execution of the mission workflow using the identified mission resources.

For the purpose of this application a mission workflow is a collection of tasks that are performed by a collection of actors, wherein an actor may be any entity that uses a mission dedicated resource. A mission dedicated resource is any resource that is at least partially dedicated to a mission.

Mission tasks are dynamic, and therefore during the course of the mission different tasks are initiated and terminated. At any given time during the mission, mission tasks may seek access to a shared mission resource. According to one aspect of the invention, each task has an associated time-value curve indicating a temporal priority of the task over the task lifetime. The time-value curves are used during resource allocation to intelligently allocate resources to tasks to optimize the performance of the mission. Each point in a time-value curve identifies a priority of QoS to be associated with the task for the point in time. This allows QoS to be adjusted in real time based on conditions in the field, thereby adding the degree of temporal granularity to the QoS structure. Controlling temporal granularity of QoS helps resolve the conflicts of congestion and while supplying all the resources to the mission within the mission time-frame, without having to expand the size of the network.

In one embodiment the PE 24 generates a time-value curve for each mission task. The time value curves are forwarded to the EM 22. At resource allocation intervals the EM references the relative values of the time-value curve of each tasks that are active at that time instance to retrieve a time-value for each task, wherein an active task is any task that has been initiated and not terminated. Using any one of a variety of selection methods, such as highest value, highest weighted value, etc., the time values are compared to select one of the active tasks.

Figure 2:
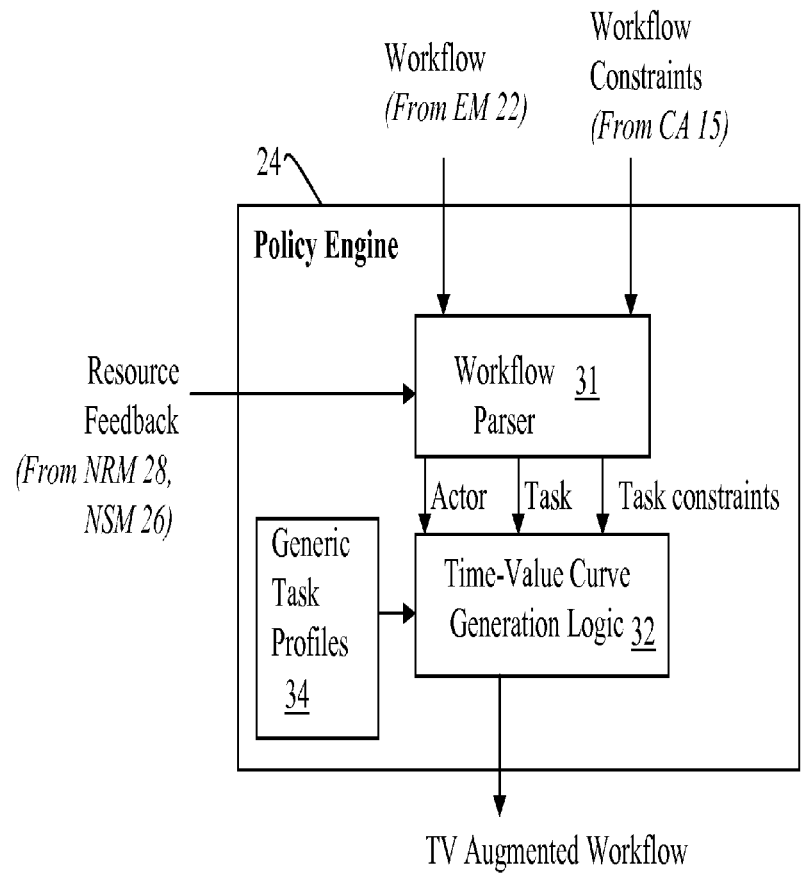
FIG. 2 is a block diagram illustrating several components that may be included in a policy engine to generate time-value curves of the present invention.

FIG. 2 illustrates several exemplary components that may be included in a PE to generate time-value curves for tasks. The PE 24 includes a workflow parser 31, a generic task profile store 34, and time-value (TV) curve generation logic 32. The workflow parser receives workflow tasks from the Execution Machine (EM). The task may have been initiated in response to a mission trigger; for example, in a surveillance mission, a mission trigger may be the capturing of an image at a sensor point in a surveillance area. The tasks may be triggered by partial or thorough completion of another task. However the task is triggered, it is forwarded to the workflow parser 31 which extracts task information that may be used to build the time-value curve. Any obtainable information which may affect a priority or quality of service to provide to the task may be provided to the time-value curve generation logic, including, for example, information regarding an actor of the task, a location of the task, a security level of the task, constraints of the tasks, dependencies of the task, power requirements of the task, execution time for the task, etc. Information regarding services and network elements that are associated with the task may also be used when calculating the time-value curve. The present invention is in no way limited to the use of any particular task information in generating a time-value curve for priority scheduling of the task.

The generic task profile store 34 may be used to store pre-determined task profiles. The predetermined task profiles are tailored to the resource requirements of various pre-defined tasks. For example, a surveillance task that performs high resolution image capture would have a time-value curve that temporally aligns the resource priority with the resource usage characteristics of the task. The resource requirements of a task may be selected from a set of pre-defined profiles, or obtained by monitoring and profiling resource usage in advance to generate a time-value profile for the task. FIGS. 3A-3H illustrates several representative time value curve profiles. A time value-curve profile such as that of FIGS. 3A and 3B may be applied to a specific task identified as having a relatively flat QoS. Profiles 3C and 3D may be used to apply a linear QoS to a task. Impulse profiles 3E and 3F may be used to provide high priority to a task for a short time. Time value curves of 7G and 7H illustrate curves that are constructed for a particular QoS profile.

Figure 4:
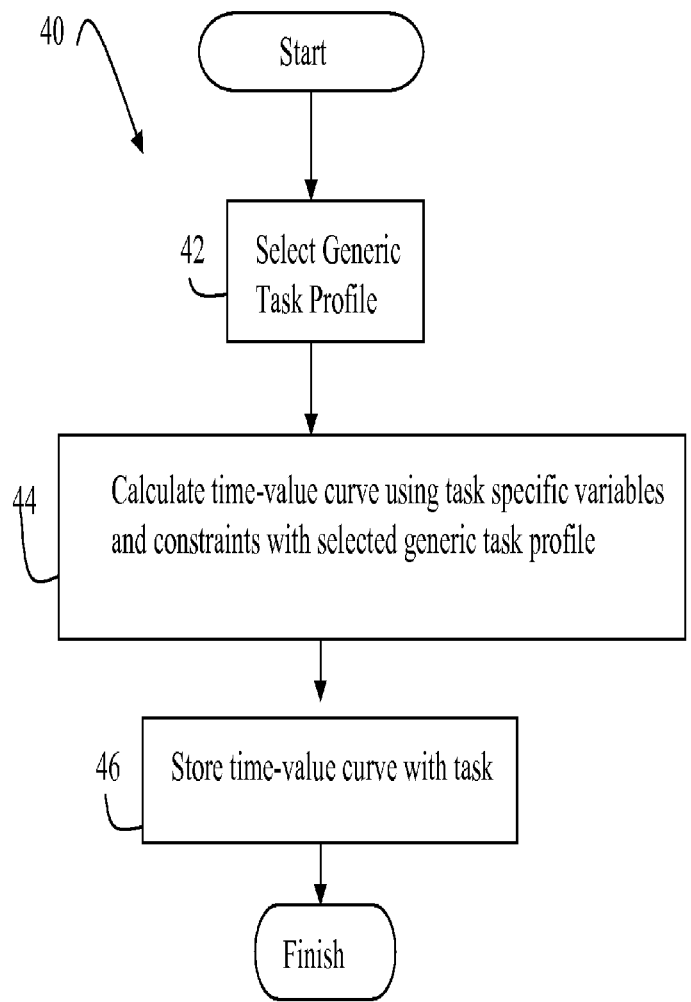
FIG. 4 is a flow diagram illustrating exemplary steps that may be performed by the policy engine of FIG. 2 to generate time-value curves for one or more tasks in a workflow.

FIG. 4 illustrates an exemplary process that may be performed by the PE 24 to construct a time-value curve for a task. At step 42 a generic profile associated with the task is retrieved from the profile store 34. At step 44, the time-value curve is piece-wise constructed using the base profile in conjunction with task specific variables, constraints and resource information using techniques known to those in the art. At step 46 the time-value curve is stored with the task. The TV augmented task is then forwarded to the EM 22.

Figure 5:
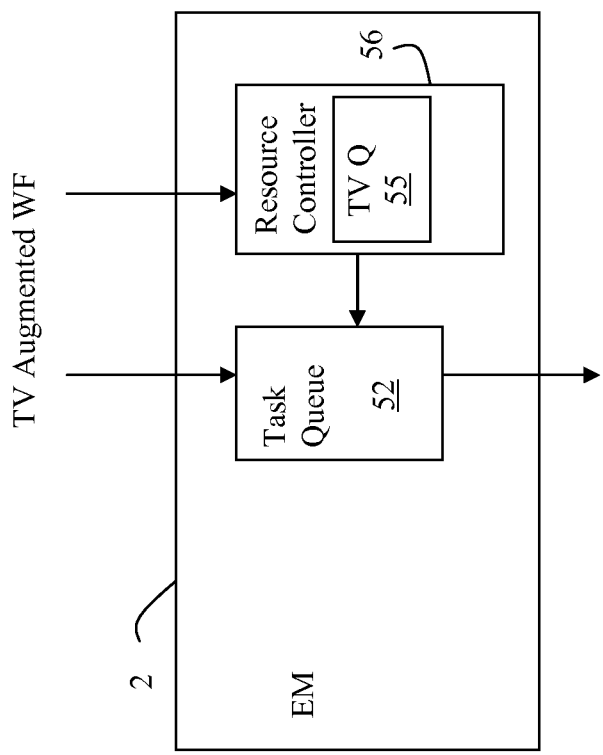
FIG. 5 is a diagram of an exemplary network or service resource manager which may use the time value curves of the present invention to control allocation of resources to workflow tasks.

FIG. 5 illustrates exemplary components that may be included in an Execution Manager 22 that uses the time-value curves of the invention. The EM 22 would generally include task queues 52 for storing active mission tasks. The task queues may be organized by mission resource. A resource controller 56 may include or otherwise have access to the Time-Value curves for the tasks, for example in a time-value queue associated with the task queue. At each mission resource allocation instance the resource controller examines the time-values of each active task associated with a resource at that instance, and selects one of the tasks based on the time-value curve.

Figure 6:
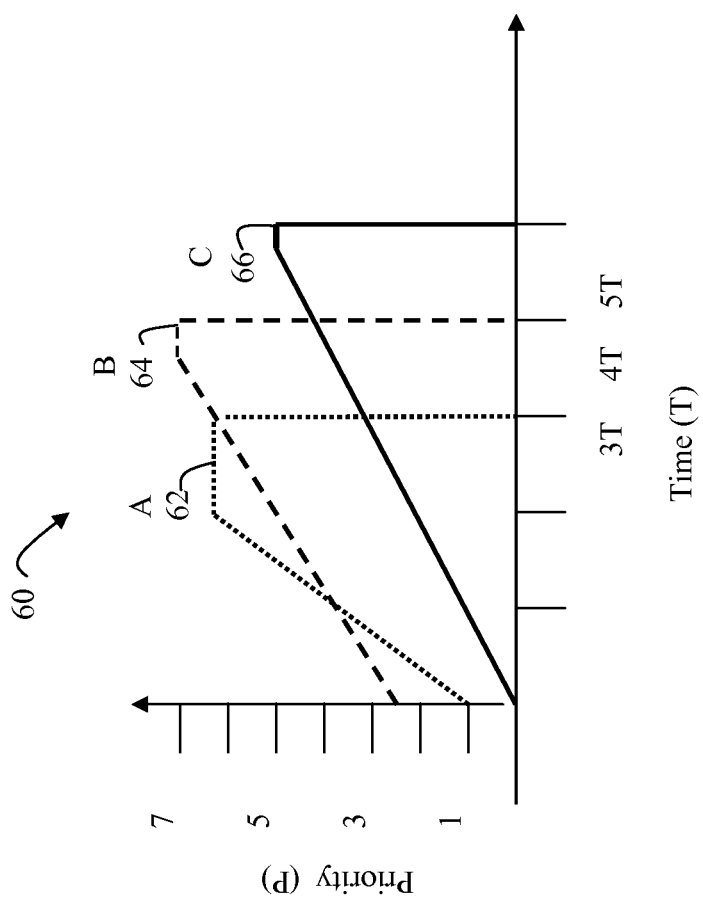
FIG. 6 is a timing diagram illustrating several exemplary time-value curves that may be assigned to tasks in a workflow.

FIG. 6 is a timing diagram illustrating illustrative time value curves for 3 tasks A (62), B (64) and C (66). The generic task profile for each of the curves is shown by below Equation I:

$$P(T)=\text{Min}(mT+b,\text{Max}P) \quad \text{Equation I:}$$

Where P is the priority, or quality of service, associated with the task at time T, m is derived based on the value of the task, the lifetime of the task and the execution time of the task and b is determined according to a value of the task. The flat portion on each of the time-value curves in this embodiment represents the time needed to complete the task. Max (P) represents the highest priority to allocate to the task.

Thus in FIG. 6 time value curve C is a lower value task, which takes a relatively short period of time to complete. Curve B has the highest initial priority task, with a shorter lifetime than curve C. Curve A has the second highest initial priority, but the shortest lifetime. Using strict priority allocation technique, task B will obtain access to the resource until time T1. At time T1, access begins to be granted to task A, with task A reaching its maximum priority at time 2 to allow it to be at maximum priority for the time period associated with executing the task. The time-value curves may thus be used provide a temporal priority of the task which ensures that the task can complete in its lifetime.

FIGS. 7A and 7B are pictorial representations of a mission workflow, provided to illustrate the dynamic nature of workflow tasks; tasks are continually instantiated and terminated during the workflow. For example, at time T4, a low priority task 68 is triggered. At time T7 a higher priority task is triggered. At any resource allocation period, the time value curves may be used to real-time, dynamic resource management for a dynamic mission workflow.

FIGS. 8A and 8B will be used to describe an exemplary embodiment of the present invention for use in a particular mission. The mission of FIG. 8 is a surveillance mission which seeks to identify individuals within a defined radius. The mission comprises dependent tasks, with a first set of tasks being associated with the detection and collection of information for each an individual that comes within a radius, a second set of tasks being associated with collecting high resolution information regarding individuals within the radius, a third set of tasks being associated with collecting increasingly images at very high resolution. Each of the tasks of in the mission use network bandwidth for the exchange of information associated with the target. The individuals are grouped into low value targets (initial priority 0); mid value targets (initial priority value 1) and high value targets (initial priority value 2). The targets are detected using mission resource sensors distributed within the radius. A detection of the target results in an attempt to collect information about the target to determine if the target is a target of interest. The collection of information may include the transmission of identification information, such as a low resolution or high resolution image. The type of collection to be performed for each target is a task in the above described architecture. The task is assigned a time-value curve which provides a temporal priority to the collection of information for the particular target.

The time value curves of FIG. 8B are associated with tasks to be performed on three targets. A first task 72 is associated with a mid priority target which has been sensed in area DS3. There are only 3 minutes to collect information regarding the target before the target leaves the area. Thus the time-value curve is adapted for this target to ensure that data collection for this target can occur within the target tracking task lifetime. A second task 74 is associated with a target in area DSa. The target has been identified as a high value target, perhaps as a result of a low-resolution image mapping task. The target is exiting the area in 4 minutes. The slope and intercept of the time-value curve reflect the perceived target value and detected target location, and ensures that adequate processing of the target may be completed before the target is lost. Time value curve 76 is associated with a task generated in response to target detection in area DS2*b*. There are 5 minutes until the target quits the area, and thus time-value curve 76 reflects the lower quality of service level to be provided to the collection of information regarding this target.

Figure 9:
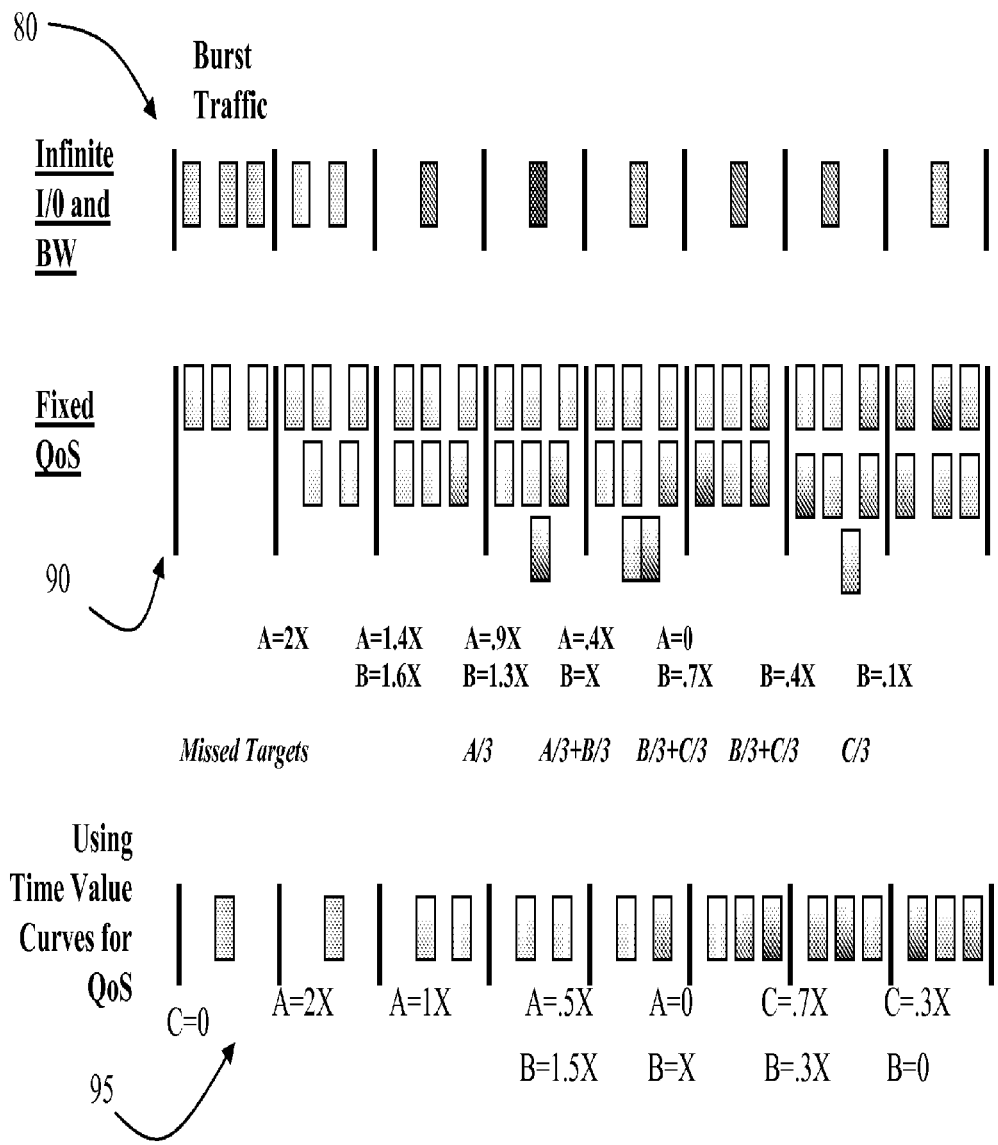
FIG. 9 is a processing timing diagram which pictorially illustrates the bandwidth smoothing capabilities of time-value QoS servicing of a workflow.

FIG. 9 is a data flow diagram intuitively illustrating the benefits of using the time-value curves of the present invention to provide real-time temporally prioritized resource allocation in to mission tasks. As will be seen from the below description, the time-value curves effectively smooth and optimize resource allocation among the tasks. Optimizing the resource allocation improves the completion rate of mission tasks and increases the chances of mission success.

Data series 80 illustrates a stream of resource requests that are received in a data stream. The performance of the mission depends upon being able to process each task in the data stream during its lifetime; if tasks are dropped or delayed, mission information is lost. In FIG. 9, each data slot represents a one minute interval, and assume that the Burst traffic received in interval 1 includes high, medium and low priority tasks having respective lifetimes of three, four and five minutes.

Data flow 90 illustrates an exemplary result of resource allocation for a mission using Fixed QoS resource allocation methods. In a typical Fixed QoS resource allocation method, a fixed bandwidth percentage is allocated to each task. During interval 1 of Data flow 90, Burst Traffic for three tasks is received. The prior art resource allocator, receiving no information from the field regarding a temporal priority of the tasks, uses a Fixed QoS to allocate resources to the tasks. Each of the three tasks is provided one third of the bandwidth. At the end of interval 1 (or one minute into the task), each of the three pending tasks in group A is ⅓ complete. During interval 2, an additional task group B is received which includes two additional tasks. Assume group B includes a medium and high priority task with respective lifetimes of four and five minutes . . . . During interval 2 the resource allocator allocates the resource equally among the tasks in group A and group B, providing one fifth of the bandwidth to each task. The Fixed QoS structure has no way to determine which task is temporally more important due to conditions in the field. After two minutes, the tasks in group A are now just over half completed. During interval 3, an additional task is received, and each task in interval 3 is assigned one sixth of the bandwidth. At the end of three minutes the high priority task of group A is dropped. Using the example of FIG. 8A, this would equate with tasks initiated for individuals in DS3 failing to complete before the individual had left the radius.

Figure 10:
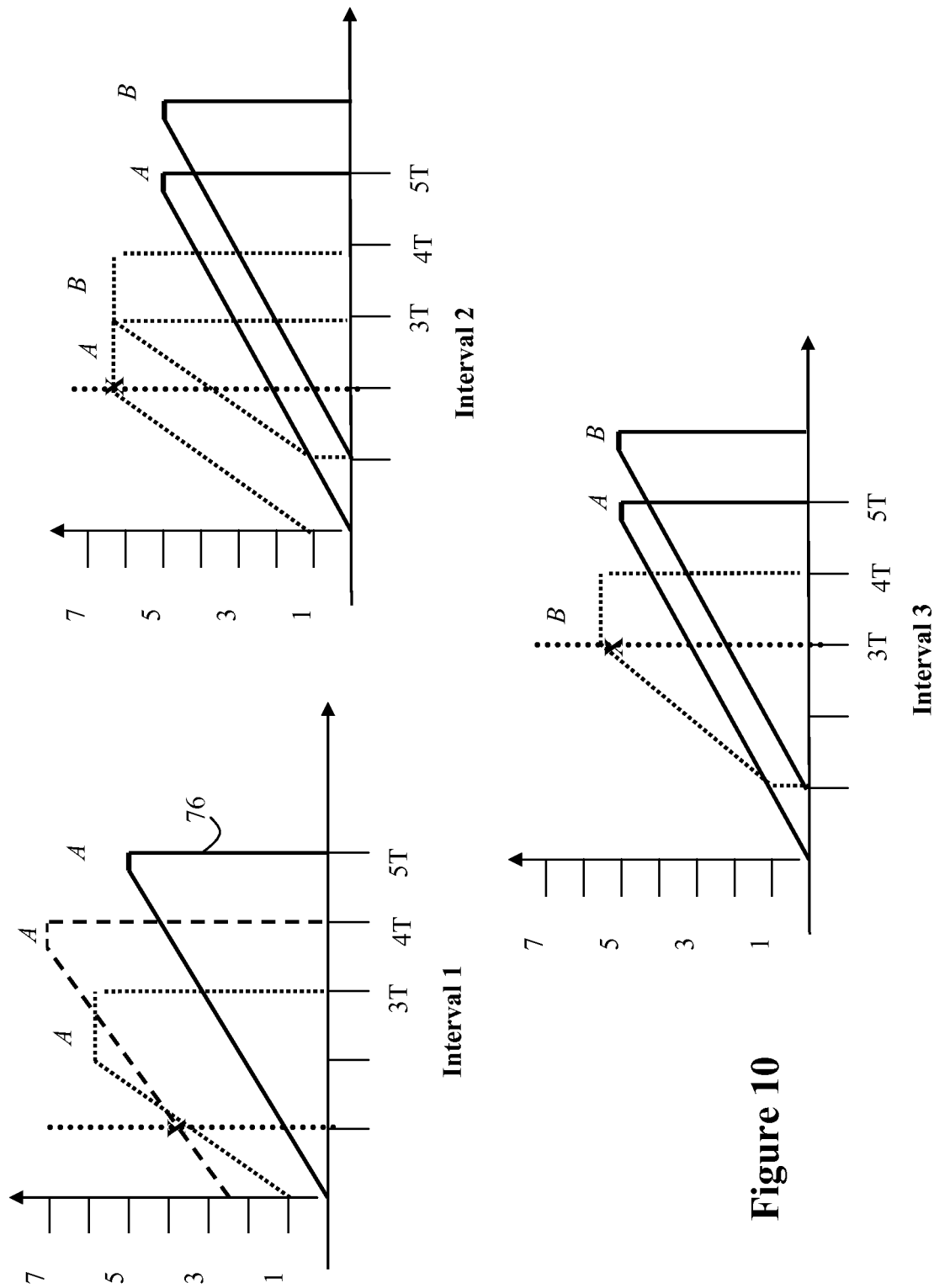
FIG. 10 is a pictorial representation of task selection using time-value curves in the example of FIG. 9.

In contrast, when time value curves are applied to the QoS paradigm, resource allocation would proceed as is shown by data flow 95; FIG. 10 is a pictorial representation of the time-value curves per task for the data flow of FIG. 9. During interval 1, when burst task set A is received a resource allocator of the present invention compares the time-value curves of each task to identify the task with temporal priority. As shown in FIG. 10, during interval 1 the high level task is given control of the resource. During interval 2, new tasks are added. However, during time interval 2 the time value curve of the mid-range task of task group A has temporal priority. Thus the mid-level task of group A is completed at two minutes. At interval 3, at least a portion of the mid-level task of group B is allocated access to the resource. Thus it can be seen that integrating time value curves into the policy and quality of service enforcement decisions increases the completion rate of high value tasks.

Time-value curves can also used to identify tasks that may not successfully complete in their lifetime. These tasks are hereinafter referred to as stalled tasks. Identifying stalled tasks allows them to be removed from resource allocation consideration, thereby reducing performance and providing a graceful degradation of performance in the face of congestion.

FIG. 11A illustrates how dynamic time-value curve analysis may be used to identify stalled tasks. In FIG. 11A, task 126 is initiated at time. However, given the temporal priorities of the other tasks in the workflow, it is unlikely that the low priority task 129 will be able to complete in its lifetime. In the present invention, the Execution Manager identifies stalled flows and removes them from the task queue, thereby simplifying the decision making process of the EM and reducing congestion. FIG. 11B is a pictorial representation of the time-value curves that are under consideration following the abortion of the stalled task.

Figure 12:
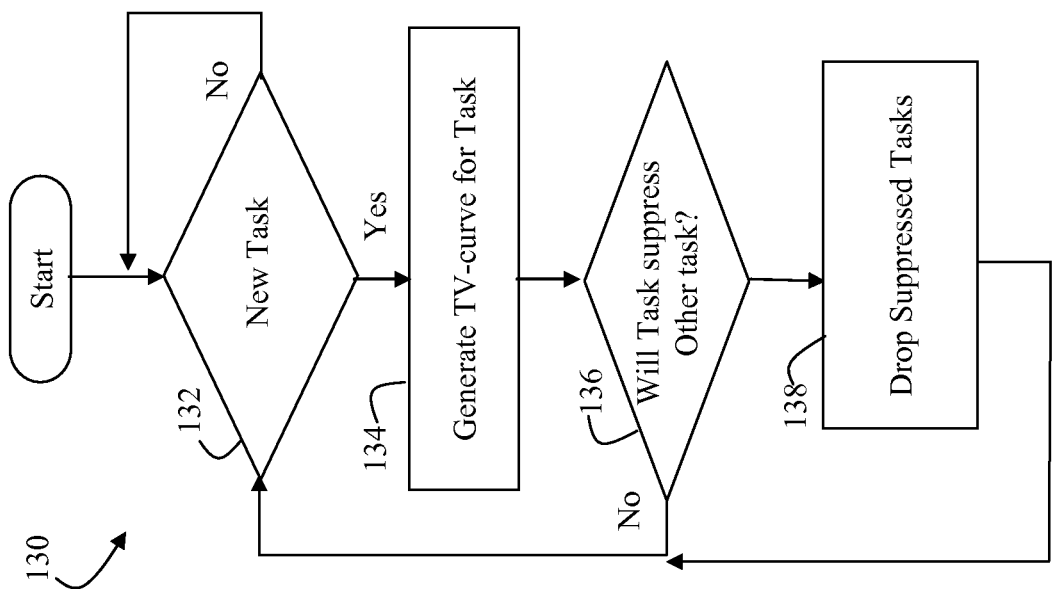
FIG. 12 is a flow diagram illustrating exemplary steps that may be performed by a policy engine performing task dropping such as that illustrated in FIGS. 11A and 11B.

FIG. 12 is a flow diagram illustrating several exemplary steps that may be performed by an Execution Manager or other resource allocator, to drop task execution using time-value curve information of the present invention. At steps 132 and 134 a time value curve is generated for each new task as described with regards to FIGS. 2-4. At step 136 it is determined whether the added task is going to result in the stalling of an existing task. If so, at step 138 the stalled task is removed from the task queue.

Figure 13:
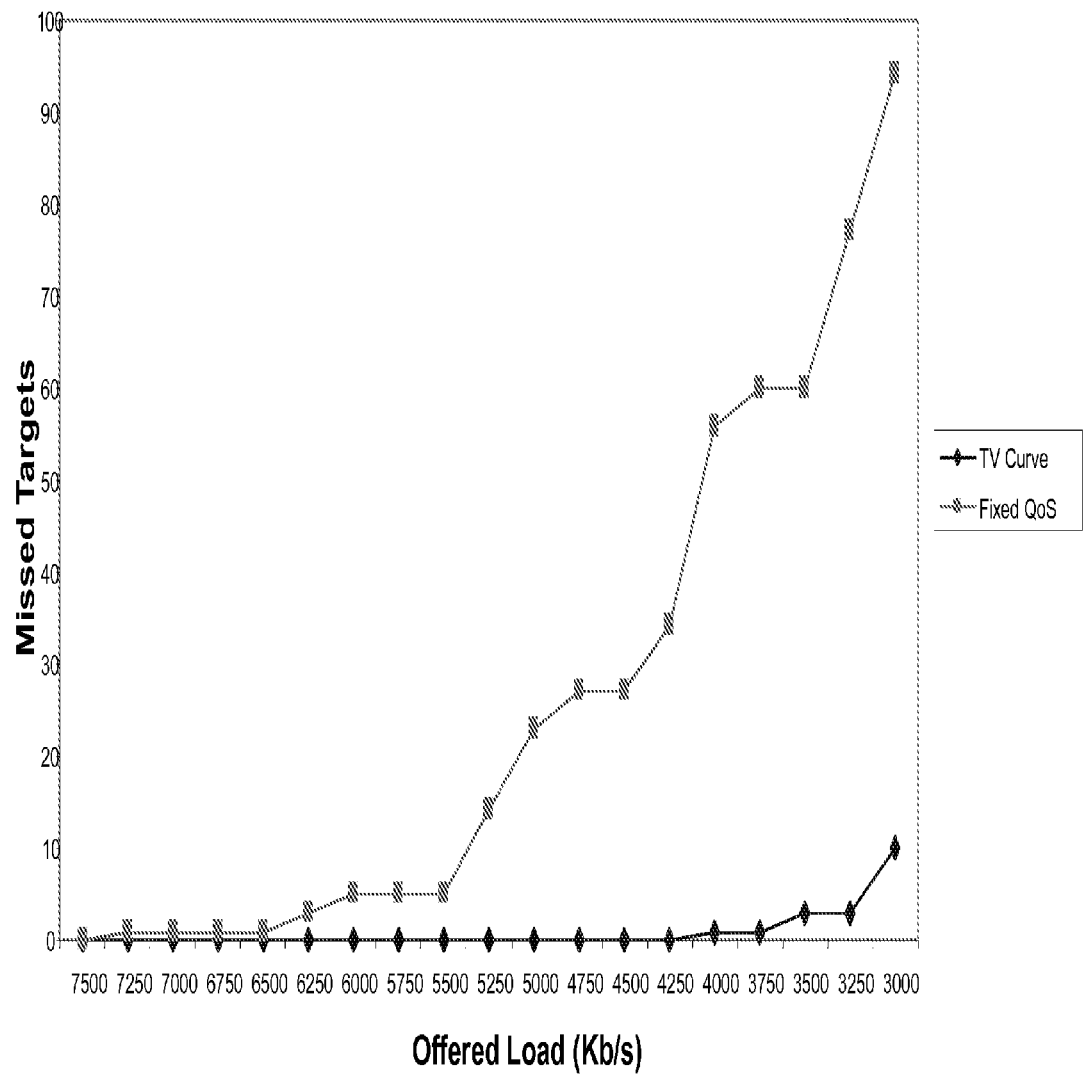
FIG. 13 is a graph illustrating the performance of TV QoS versus Fixed QoS as the offered load increases.

FIG. 13 is a graph that is provided to illustrate the performance of a TV QoS system versus that of a fixed QoS as the offered load increases. As shown in FIG. 13, the number of missed targets increases linearly with the increase in load. In contrast, the TV QoS does not begin to drop targets until the average traffic approaches the offered load (as indicated by the dashed line X in FIG. 13).

Figure 14:
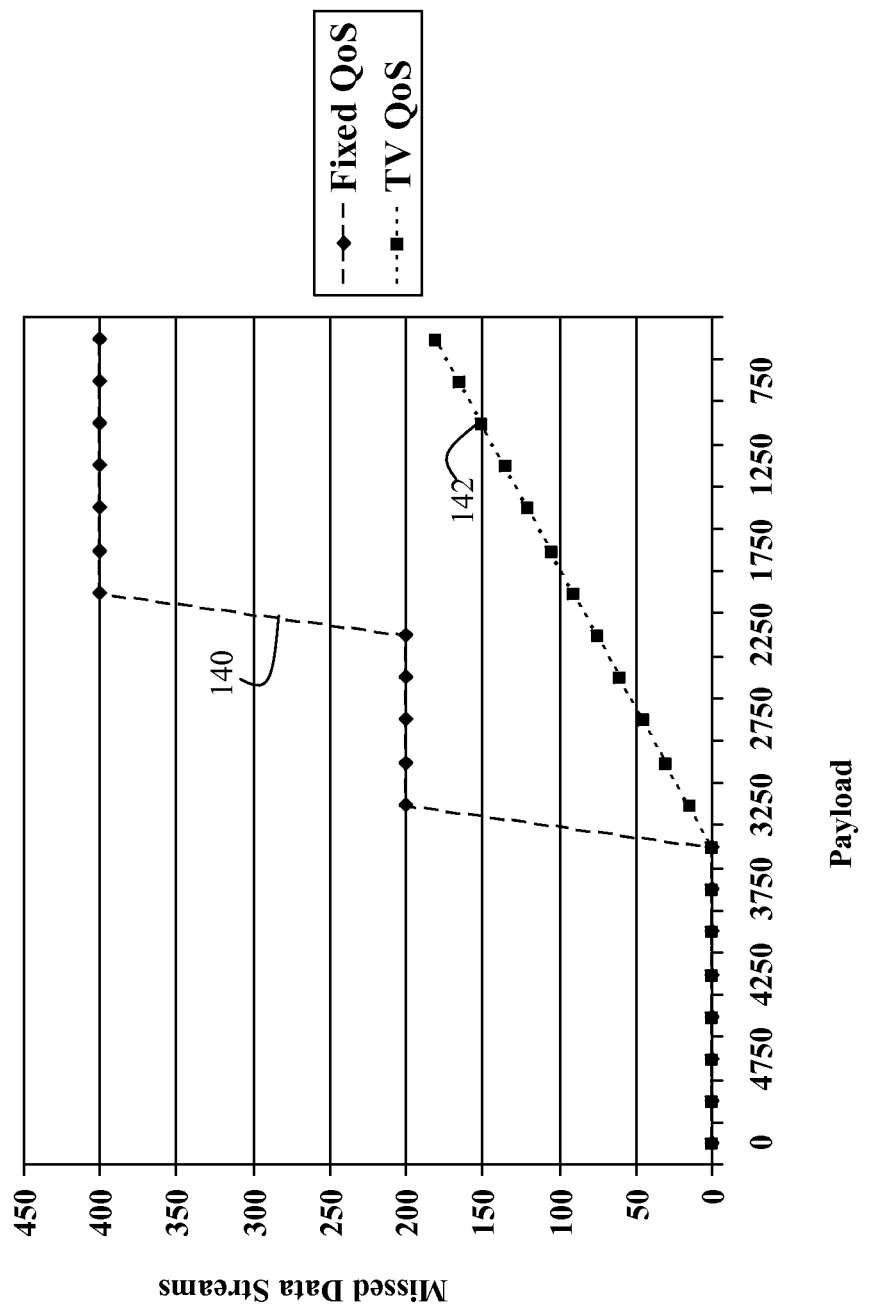
FIG. 14 is a graph illustrating how TV QoS provides for graceful network failure.

FIG. 14 is a graph that is provided to illustrate the graceful performance degradation that can be realized in a network which implements time-value curves of the present invention to abort stalled queues. As the size of the packet payload is reduced the frequency of resource accesses is increased. Once the offered load is less than the average traffic, resource congestion quickly ensues, and data stream are dropped. The present invention uses time-value curves to identify the most temporally relevant tasks even during congestion, thereby resulting in graceful network performance degradation in the face of congestion as shown in FIG. 13.

Accordingly a method and apparatus has been shown and described which allows Quality of Service to be controlled at a temporal granularity. Time-value curves, generated for each task, ensure that mission resources are utilized in a manner which optimizes mission performance. It should be noted, however, that although the present invention has shown and described the use of time-value curves as applied to mission workflow tasks, the present invention is not limited to this application; rather, it can be readily appreciated by one of skill in the art that time-value curves may be used to optimize the delivery of any resource to any consumer by taking into account the dynamic environment of the consumer and resource. The allocation of any resource, including network bandwidth, storage, processing capability, etc., may benefit from the teachings of the present invention.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. These components may be implemented in hardware, software or a combination thereof. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method of allocating at least one network resource among a plurality of tasks, at least one task of the plurality of tasks having a respective priority that varies continuously as a function of time, the method comprising:

over each of a plurality of time intervals, allocating the at least one network resource based on relative values of the respective priorities over each of the plurality of time intervals, the at least one task of the plurality of tasks having a respective priority that increases from a non-zero lowest value at a beginning of a finite time interval for which the at least one task is executing to a highest value before the end of the finite time interval and remains at the highest value until the end of the finite time interval.

2. The method of claim 1, wherein allocating the at least one network resource based on relative values of the respective priorities over each of the plurality of time intervals comprises allocating the at least one network resource over each respective time interval of the plurality of time intervals having a highest priority value over that respective time interval.

3. The method of claim 1, wherein allocating the at least one network resource based on relative values of the respective priorities over the plurality of time intervals comprises allocating the at least one network resource over each respective time interval of the plurality of time intervals to the plurality of tasks in proportion to their respective priorities over that respective time interval.

4. The method of claim 1, wherein the finite time interval extends from a start time to an end time.

5. The method of claim 1, further comprising: receiving via a user interface information pertaining to the plurality of tasks; and deriving a priority value as a function of time for each task of the plurality of tasks from the received information pertaining to the plurality of tasks.

6. The method of claim 5, wherein deriving a priority value as a function of time for each task comprises modifying a generic priority function for each task based on the received information pertaining to the plurality of tasks.

7. The method of claim 1, further comprising dynamically adjusting the respective priority function of time for at least one task in response to network conditions.

8. A system for allocating at least one network resource among a plurality of tasks, each task having a respective priority that varies continuously as a function of time, the system comprising:
   at least one processor; and
   at least one memory configured to store instructions for execution by the at least one processor, the instructions comprising instructions that, when executed:
      allocate, over each of a plurality of time intervals, the at least one network resource based on relative values of the respective priorities over each of the plurality of time intervals, at least one task of the plurality of tasks having a respective priority that increases from a non-zero lowest value at a beginning of a finite time interval for which the at least one task is executing to a highest value before the end of the finite time interval and remains at the highest value until the end of the finite time interval.

9. The system of claim 8, wherein the instructions that, when executed, allocate the at least one network resource based on relative values of the respective priorities over each of the plurality of time intervals comprise:
   instructions, that when executed, allocate the at least one network resource over each respective time interval of the plurality of time intervals having a highest priority value over that respective time interval.

10. The system of claim 8, wherein the instructions that, when executed, allocate the at least one network resource based on relative values of the respective priorities over the plurality of time intervals comprise:
   instructions that, when executed, allocate the at least one network resource over each respective time interval of the plurality of time intervals to the plurality of tasks in proportion to their respective priorities over that respective time interval.

11. The system of claim 8, wherein the finite time interval extends from a start time to an end time.

12. The system of claim 8, wherein the instructions further comprise instructions that, when executed:
   receive via a user interface information pertaining to the plurality of tasks; and
   derive a priority value as a function of time for each task of the plurality of tasks from the received information pertaining to the plurality of tasks.

13. The system of claim 12, wherein the instructions that, when executed, derive a priority value as a function of time for each task include instructions that, when executed, modify a generic priority function for each task based on the received information pertaining to the plurality of tasks.

14. The system of claim 8, wherein the instructions further comprise instructions that, when executed, dynamically adjust the respective priority function of time for at least one task in response to network conditions.

* * * * *